US012636776B2

(12) United States Patent
Fiorio et al.

(10) Patent No.: US 12,636,776 B2
(45) Date of Patent: May 26, 2026

(54) METHOD FOR CONTROLLING A ROBOTIC GRIPPER USING FRICTION ESTIMATION

(71) Applicant: CAMOZZI AUTOMATION S.P.A., Milan (IT)

(72) Inventors: Luca Fiorio, Genoa (IT); Rocco Antonio Romeo, Rome (IT); Marco Rossi, Gussago (IT); Alberto Mingotti, Puegnago sul Garda (IT); Salvatore Palmieri, Brescia (IT)

(73) Assignee: CAMOZZI AUTOMATION S.P.A., Milan (IT)

( * ) Notice: Subject to any disclaimer, the term of this patent is extended or adjusted under 35 U.S.C. 154(b) by 229 days.

(21) Appl. No.: 18/573,197

(22) PCT Filed: Jul. 12, 2022

(86) PCT No.: PCT/IB2022/056426
§ 371 (c)(1),
(2) Date: Dec. 21, 2023

(87) PCT Pub. No.: WO2023/002303
PCT Pub. Date: Jan. 26, 2023

(65) Prior Publication Data
US 2024/0300094 A1       Sep. 12, 2024

(30) Foreign Application Priority Data

Jul. 19, 2021     (IT) ........................ 102021000019049

(51) Int. Cl.
| | |
|---|---|
| *B25J 9/16* | (2006.01) |
| *B25J 13/08* | (2006.01) |
| *B25J 15/02* | (2006.01) |

(52) U.S. Cl.
CPC ........... *B25J 9/1612* (2013.01); *B25J 9/1641* (2013.01); *B25J 13/082* (2013.01); *B25J 15/0273* (2013.01)

(58) Field of Classification Search
CPC ...... B25J 9/1612; B25J 9/1641; B25J 13/082; B25J 15/0273; G05B 19/404;
(Continued)

(56) References Cited

U.S. PATENT DOCUMENTS 6,484,601 B1 * 11/2002 Arrichiello ................ B25J 9/14
92/37
10,875,195 B2 * 12/2020 Zitting ................. B25J 15/0023
(Continued)

FOREIGN PATENT DOCUMENTS

DE     102019127260 A1 *  4/2021   ............ B25J 9/1641
WO       2020211914 A1   10/2020

OTHER PUBLICATIONS

Spenninger et al., Translated Description of DE102019127260A1, Accessed via Patent Translate and Espacenet, filed Oct. 10, 2019. (Year: 2019).*
(Continued)

*Primary Examiner* — Wade Miles
*Assistant Examiner* — Sidney Leigh Molnar
(74) *Attorney, Agent, or Firm* — CANTOR COLBURN LLP

(57) ABSTRACT

A gripper which has a friction estimation module configured to estimate static and/or dynamic friction forces acting on gripping jaws is provided. The static friction force is calculated on the basis of constraining reactions whereto the gripping jaws are subjected, the constraining reactions being calculated at least as a function of an actuation force exerted on the gripping jaws, a coefficient of friction of gripper materials and/or lubricant used being known. The dynamic
(Continued)

friction force is calculated on the basis of speed of the gripping jaws, width of sliding surfaces and distance between the sliding surfaces of the gripping jaws, the viscosity of the lubricant used being known.

14 Claims, 3 Drawing Sheets

(58) Field of Classification Search
CPC ........... G05B 2219/39505; G05B 2219/39532; G05B 2219/40551; G05B 2219/41154; G05B 2219/41161
USPC ................. 700/245–264; 318/568.11–568.25
See application file for complete search history.

(56) References Cited

U.S. PATENT DOCUMENTS

| | | | | |
|---|---|---|---|---|
| 11,090,818 | B2* | 8/2021 | Curhan | B25J 15/12 |
| 11,679,514 | B2* | 6/2023 | Su | B25J 15/12 |
| | | | | 294/198 |
| 2001/0017528 | A1* | 8/2001 | Takanashi | B25J 15/028 |
| | | | | 318/568.21 |
| 2006/0175770 | A1* | 8/2006 | Linzell | B25B 23/0035 |
| | | | | 279/71 |
| 2009/0076657 | A1* | 3/2009 | Tsuboi | G05B 13/021 |
| | | | | 700/275 |
| 2010/0052348 | A1* | 3/2010 | Williams | F16C 29/126 |
| | | | | 294/119.1 |
| 2012/0286533 | A1* | 11/2012 | Mettler | B25J 19/023 |
| | | | | 294/213 |
| 2013/0245829 | A1* | 9/2013 | Ohta | B25J 9/1641 |
| | | | | 901/9 |
| 2014/0028118 | A1* | 1/2014 | Sakano | B25J 9/1612 |
| | | | | 310/12.14 |
| 2014/0207275 | A1* | 7/2014 | Sakano | B25J 15/026 |
| | | | | 700/213 |
| 2015/0314445 | A1* | 11/2015 | Naitou | B25J 9/1674 |
| | | | | 700/258 |
| 2019/0121426 | A1* | 4/2019 | Matsuike | G06F 3/017 |
| 2020/0121341 | A1* | 4/2020 | Ogata | B25J 9/1674 |
| 2020/0237461 | A1* | 7/2020 | Kadokura | A61B 34/37 |
| 2021/0094185 | A1* | 4/2021 | Yun | B25J 13/085 |
| 2021/0260776 | A1* | 8/2021 | Nagakari | B25J 9/1612 |
| 2021/0268628 | A1* | 9/2021 | Gray | B25B 1/18 |
| 2022/0234200 | A1* | 7/2022 | Narita | B25J 13/083 |
| 2022/0296231 | A1* | 9/2022 | Adams | A61B 17/072 |
| 2023/0125022 | A1* | 4/2023 | Li | B25J 9/023 |
| | | | | 700/245 |
| 2023/0136450 | A1* | 5/2023 | Ide | B25J 9/1612 |
| 2024/0115343 | A1* | 4/2024 | Takao | B25J 15/08 |
| 2025/0222600 | A1* | 7/2025 | Grossard | B25J 9/1612 |

OTHER PUBLICATIONS

International Search Report for International Patent Application No. PCT/IB2022/056426, mailed Oct. 19, 2022.
Romeo Rocco A. et al., Methods and Sensors for Slip Detection in Robotics: A Survey, IEEE Access, Jan. 1, 2020, pp. 73027-73050, vol. 8, IEEE.
Romeo Rocco A. et al., Force Control with Friction Compensation in a Pneumatic Gripper, 2021 IEEE/RSJ International Conference on Intelligent Robots and Systems (IROS), Prague, Czech Republic, Sep. 27, 2021, pp. 7231-7237, IEEE.
R. A. Romeo et al., Closed-loop Force Control of a Pneumatic Gripper Actuated by Two Pressure Regulators, 2019 IEEE/RSJ International Conference on Intelligent Robots and Systems (IROS), Macau, China, Nov. 4-8, 2019, pp. 7157-7162, IEEE.

* cited by examiner

METHOD FOR CONTROLLING A ROBOTIC GRIPPER USING FRICTION ESTIMATION

CROSS-REFERENCE TO RELATED APPLICATIONS

This application is a National Phase Application of PCT International Application PCT/IB2022/056426, having an International Filing Date of Jul. 12, 2022 which claims priority to Italian Application No. 102021000019049 filed Jul. 19, 2021, each of which is hereby incorporated by reference in its entirety.

FIELD OF THE INVENTION

The present invention relates to a gripper and a method for controlling the gripping force of such a gripper, particularly for robotic applications.

BACKGROUND OF THE INVENTION

Grippers that are suitable for gripping and carrying an item are well known. Grippers generally comprise a gripper body and at least two jaws or gripping fingers, at least one thereof movable with respect to another between a jaw opening position (which corresponds for example to an inactive position) and a jaw closing position (which corresponds for example to an item gripping position).

For example, in the case of pneumatic grippers, inside the gripper body is housed a pneumatic actuation group that is operationally coupled to the jaws in order to move, by means of a pressure control fluid, the jaws between the opening position and the closing position. The gripping force is regulated by means of a pressure regulator that is suitable for regulating the pressure of the control fluid within the pneumatic actuation group.

In some known embodiments, for example of the type wherein the jaws slide along linear guides, the grippers are affected by the presence of non-negligible friction forces that make it difficult to accurately perform some actions in robotic manipulation applications. Furthermore, due to friction, gluing or slipping phenomena may occur.

In particular, one of the most marked effects of the presence of friction forces is that, for a given actuation force exerted on the jaws, the gripping forces decrease rapidly as the distance of the item gripped from the base of the gripper increases. Furthermore, dry friction forces create a dead band that complicates the application of small forces below the initial force threshold. Finally, when the gripping force is controlled, the friction forces act as disturbances, thus complicating the planning and execution of gripping actions.

All of the effects mentioned above make it difficult to:

detect contact between the gripping jaws and the item to be gripped, assess whether the item to be handled has actually been gripped;

assess whether the resulting grip has been obtained in the desired manner;

control the gripping force.

Generally, it is difficult to control the jaws of a gripper, especially in the case of a pneumatic gripper. Usually, therefore, the jaws are kept either completely open or completely closed.

For example, controlling the force applied by the pneumatic grippers is not easy due also to the dependence of this force upon the air pressure within the gripper chambers.

Finally, pneumatic grippers are normally devoid of a position detection system. For this reason, the precise positioning of the gripping jaws may only be obtained for "completely open" and "completely closed" positions but not for intermediate positions.

In the literature, controlling the force of pneumatic grippers has been presented in some works. For example, in E. Ottaviano, M. Toti, and M. Ceccarelli, "Grasp force control in two finger grippers with pneumatic actuation," Proceedings of ICRA 2000, vol. 2, pp. 1976-1981, 2000, proportional-integral control has been proposed; in R. A. Romeo et al., "Closed-loop force control of a pneumatic gripper actuated by two pressure regulators", IEEE/RSJ IROS, 2019, commercial force sensors have been proposed in order to close the ring; in A. K. Paul, J. Mishra, and M. Radke, "Reduced order sliding mode control for pneumatic actuator," IEEE Transactions on Control Systems Technology, vol. 2, No. 3, pp. 271-276, 1994, a sliding control method has been proposed, which is based on measuring the position and on an estimation of the speed. More sophisticated algorithms that use, for example, quadratic programming functions (R. A. Romeo et al., "Closed-loop force control of a pneumatic gripper actuated by two pressure regulators, IEEE/RSJ IROS, 2019) or Kalman filters (R. A. Romeo et al., "Dynamic control of a pneumatic rigid gripper", IEEE Robotics and Automation Letters, 2020), however, do not solve the problem of the presence of friction.

SUMMARY OF THE INVENTION

An object of the present invention is therefore to propose a gripper and a gripping force control method that is capable of compensating for the effects of friction forces.

Another object of the invention is to provide a gripper and a gripping force control method that allow for better handling of gripped items, more accurate control of the gripping force and greater precision in the controlling of the position of the jaws.

These objectives are achieved by a gripper and a gripping force control method as described and claimed herein.

Preferred or advantageous embodiments of the control method and of the gripper are also described.

According to a general embodiment, the gripper comprises a gripper body, at least two gripping jaws, wherein at least one thereof is movable with respect to another between a jaw open position and a jaw closed position, an actuation group housed within the gripper body, and a transmission group housed within the gripper body.

The actuation group is operatively coupled to the at least one movable jaw by means of the transmission group in order to move the movable jaw between the opening position and the closing position.

The gripper also includes a jaw position sensor that is suitable for measuring the absolute position of the jaws, and a possible gripping force sensor that is suitable for measuring the gripping force exerted by the jaws upon the item.

The gripper is equipped with a processing unit that is operatively connected to such sensors and to the actuation group.

The processing unit comprises a friction estimation module and a friction compensation module.

The friction estimation module is configured to estimate the static and/or dynamic friction forces acting upon the components of the transmission group and upon the jaws, the static friction forces being calculated by the estimation module on the basis of the constraining reactions to which the components of the transmission group and the jaws are subjected, the constraining reactions being calculated at least as a function of the actuation force exerted by the actuation group and/or the gripping force measured by the gripping force sensor, the coefficient of friction ($\mu_i$) of the gripper materials and/or the lubricant used being known.

The dynamic friction forces are calculated on the basis of the speed of the jaws, the width of the sliding surfaces and the distance between said sliding surfaces of the jaws, the viscosity of the lubricant used being known.

The friction compensation module is configured to control the actuation group based on signals from the sensors and the estimation of the friction forces from the estimation module.

In one embodiment, the gripper further comprises an actuation force sensor that is suitable for measuring the actuation force exerted by the actuation group on the at least one movable jaw (by means of the transmission group).

In one embodiment, the gripper furthermore comprises at least one center-of-pressure sensor that is suitable for detecting the coordinates of the center of pressure (CoP) between the gripper jaws when the jaws exert a gripping force on the item.

At least some of the components of the constraining reaction $R_i$ may be calculated as a function of the coordinates of the center of pressure (CoP).

In some embodiments, with i indicating the number of surfaces exerting a constraining reaction, the i-th component of the static friction force ($F_{fi}$) is estimated by means of the formula $$F_{fi} = R_i * \mu_i * \beta,$$

where $R_i$ is the i-th component of the constraining reaction acting upon the i-th surface and $\beta$ is a parameter indicating the direction of the friction force.

In some embodiments, the static friction force (F) is estimated using the Coulomb model expressed by the formula $$F = \begin{cases} F_C \mathrm{sgn}(\dot{z}) & \text{if } \|\dot{z}\| \neq 0 \\ \min(\|F_e\|, F_C)\mathrm{sgn}(F_e) & \text{if } \|\dot{z}\| = 0 \end{cases}$$

where $\dot{z}$ is the speed of the jaws, $F_c = R_i * \mu c$, where $R_i$ is the i-th component of the constraining reaction acting upon the i-th surface, $\mu c$ is the coefficient of kinetic friction, and where $F_e$ is the resultant of the external forces.

In some embodiments, with i indicating the number of sliding surfaces, the i-th component of the dynamic friction force ($F_{vi}$) is estimated by means of the formula $$F_{vi} = C_i * \dot{z}$$

where $C_i = \eta_i * (S_i/d_i)$, where $\dot{z}$ is the speed of the jaws, $\eta_i$ is the viscosity of the lubricant used, $S_i$ is the width of the i-th sliding surface and $d_i$ is the distance between the i-th sliding surface and the surface against which it slides.

In one embodiment, the center-of-pressure sensor (CoP) is based upon the gripping force sensor, the gripping force sensor being suitable for performing torque measurements.

In this case, the processing unit is programmed to calculate the coordinates ($CoP_X$, $CoP_Y$) of the center of pressure as:

$$\begin{cases} CoP_X = \dfrac{M_Y}{|F_Z|} \\ CoP_Y = \dfrac{M_X}{|F_Z|} \end{cases}$$

where $M_X$ and $M_Y$ are the measured moments of the effective gripping force sensor along the X and Y axes, respectively, and where $|F_Z|$ is the absolute value of the actual gripping force along the Z axis.

An object of the present invention is also a method of controlling the gripping force of a pneumatic gripper, wherein the gripper comprises a gripper body, at least two gripping jaws, at least one thereof is movable with respect to another between a jaw open position and a jaw closed position, an actuation group housed inside the gripper body, and a transmission group housed inside the gripper body, the actuation group being operatively coupled to the at least one movable jaw by means of the transmission group in order to move the movable jaw between the opening position and the closing position.

According to a general embodiment, the method comprises the steps of:

estimating the static and/or dynamic friction forces acting upon the components of the transmission group and upon the jaws, adjusting the actuation force exerted by the actuation group on the at least one movable jaw based upon the estimation of the friction forces.

The static friction forces are calculated on the basis of the constraining reactions whereto the components of the transmission group and the jaws are subjected, the constraining reactions being calculated at least as a function of the actuation force exerted by the actuation group and/or the gripping force exerted by the jaws on the item, the coefficient of friction ($\mu_i$) of the gripper materials and/or the lubricant used being known.

The dynamic friction forces are calculated on the basis of the speed of the jaws, the width of the sliding surfaces and the distance between said sliding surfaces of the jaws, the viscosity of the lubricant used being known.

In some embodiments, with i indicating the number of surfaces exerting a constraining reaction, the i-th component of the static friction force ($F_{fi}$) is estimated by means of the formula $$F_{fi} = R_i * \mu_i * \beta,$$

where $R_i$ is the i-th component of the constraining reaction acting upon the i-th surface and $\beta$ is a parameter indicating the direction of the friction force.

In some embodiments, the static friction force (F) is estimated using the Coulomb model expressed by the formula $$F = \begin{cases} F_C \mathrm{sgn}(\dot{z}) & \text{if } \|\dot{z}\| \neq 0 \\ \min(\|F_e\| \cdot F_C)\mathrm{sgn}(F_e) & \text{if } \|\dot{z}\| = 0 \end{cases}$$

where ż is the speed of the jaws, $F_c=R_i*\mu c$, where $R_i$ is the i-th component of the constraining reaction acting upon the i-th surface, $\mu c$ is the coefficient of kinetic friction, and where Fe is the resultant of the external forces.

In some embodiments, the method further provides for calculating the center of pressure (CoP) coordinates between the jaws of the gripper when the jaws exert a gripping force on the item, and calculating at least some of the components of the constraining reaction $R_i$ as a function of such center of pressure (CoP) coordinates.

In some embodiments, with i indicating the number of sliding surfaces, the i-th component of the dynamic friction force $(F_{vi})$ is estimated by means of the formula $$F_{vi} = C_i * ż$$

where $C_i=\eta_i*(S_i/d_i)$, where ż is the speed of the jaws, $\eta_i$ is the kinematic viscosity of the lubricant used, $S_i$ is the width of the i-th sliding surface and $d_i$ is the distance between the i-th sliding surface and the surface against which it slides.

BRIEF DESCRIPTION OF THE FIGURES

Further features and advantages of the pneumatic gripper and of the gripping force control method according to the invention shall be made readily apparent from the following description of preferred embodiments thereof, provided purely by way of non-limiting example, with reference to the accompanying figures, wherein.

DETAILED DESCRIPTION

Figure 1:
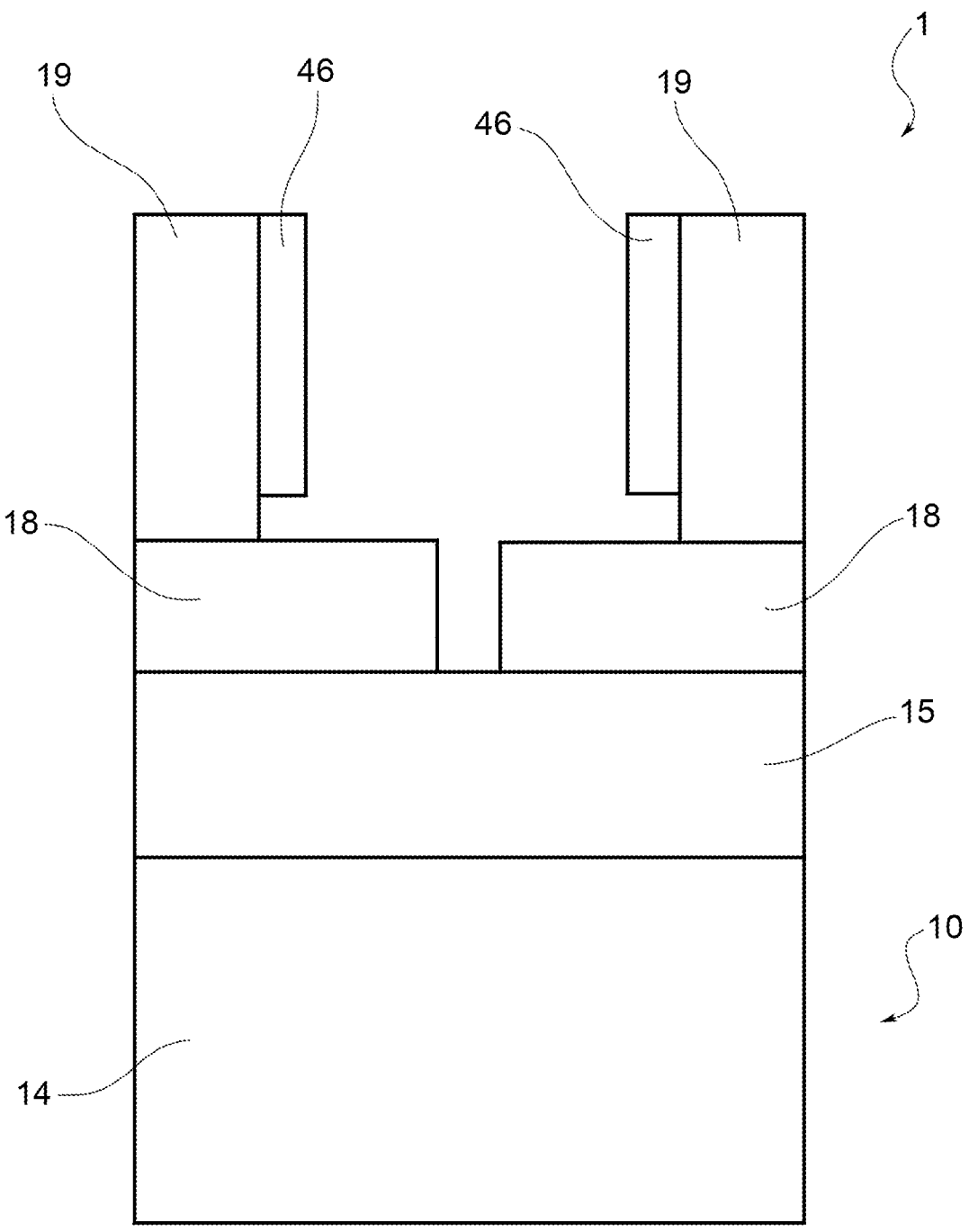
FIG. 1 schematically represents a generic gripper.

In said drawings, a pneumatic gripper has been indicated schematically as a whole with the reference number 1.

The gripper 1 comprises a gripper body 10, at least two gripping jaws 18, wherein at least one thereof is movable with respect to another between an inactive opening position and a closed item gripping position, an actuation group 14 housed within the gripper body, and a transmission group 15 housed within the gripper body 10.

The actuation group 14 is operatively coupled to the at least one movable jaw by means of the transmission group 15 in order to move the movable jaw between the opening position and the closing position.

In one embodiment, a gripping finger 19 is rigidly connected to each gripping jaw 18.

The gripper also comprises a jaw position sensor that is suitable for measuring the absolute position of the jaws.

The gripper 1 can furthermore be equipped with a gripping force sensor 46 that is suitable for measuring the gripping force exerted by the jaws on the item.

Figure 2:
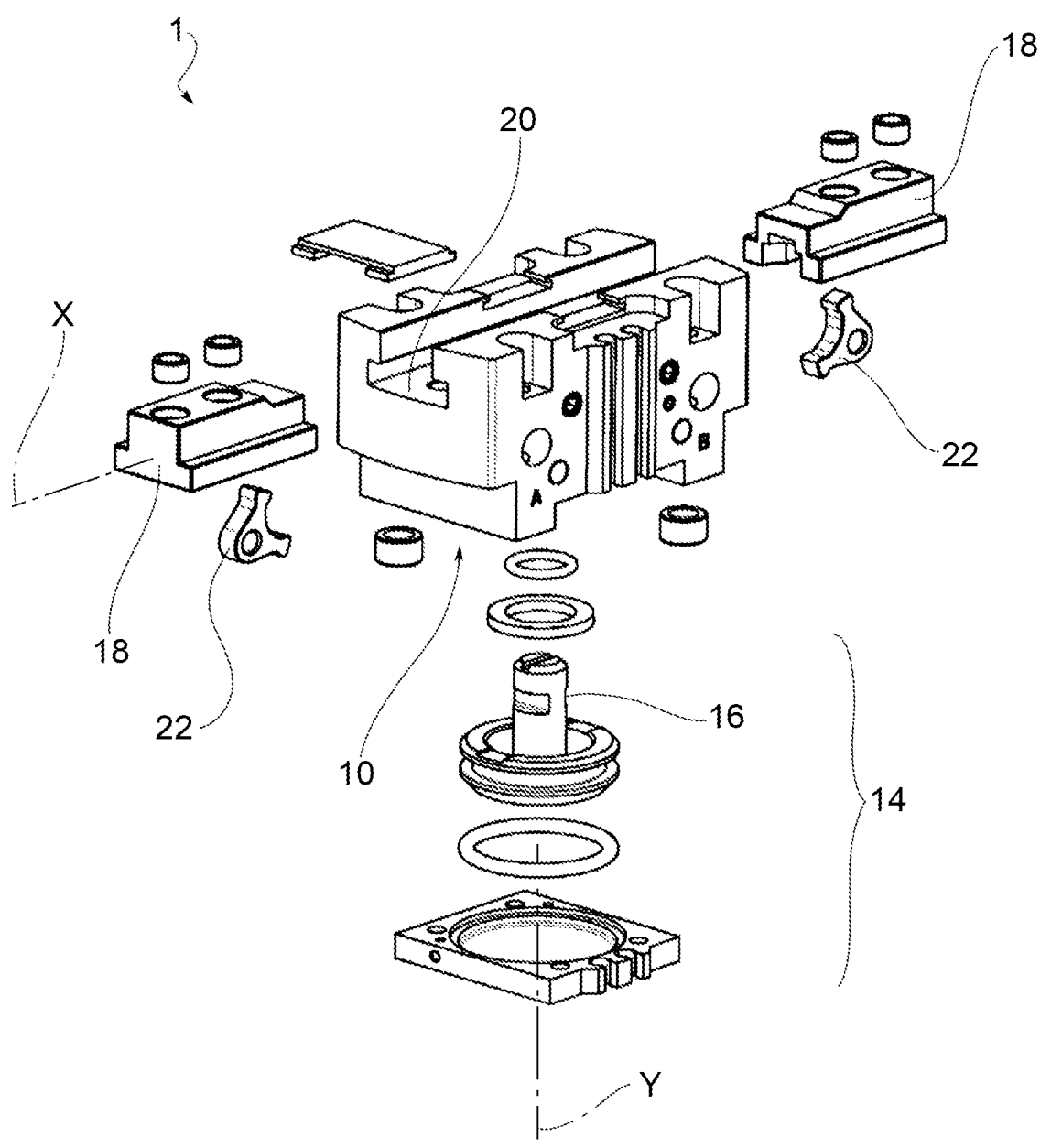
FIG. 2 is a perspective exploded view of an embodiment of a pneumatic gripper.

In an embodiment illustrated in FIG. 2, the gripper 1 is a pneumatic gripper and the actuation group is a pneumatic actuation group operating by means of a pressurized fluid, for example compressed air.

In an embodiment illustrated in FIG. 2, the pneumatic actuation group 14 comprises a piston unit comprising a piston 16 slidably housed within a piston chamber obtained in the gripper body 10. The piston 16 is operatively connected to two sliding jaws 18 within a jaw guide 20, for example a "T" guide. Each jaw 18 rigidly supports a respective finger 19.

In the embodiment illustrated in the example of FIG. 2, the jaws 18 are slidable along an axis of jaw translation Z and the piston 16 is slidable along a piston axis X, perpendicular to the axis of jaw translation Z. The pneumatic actuation group 14 comprises a pair of return levers 22 connecting a respective jaw 18 to the piston 16.

Figure 3:
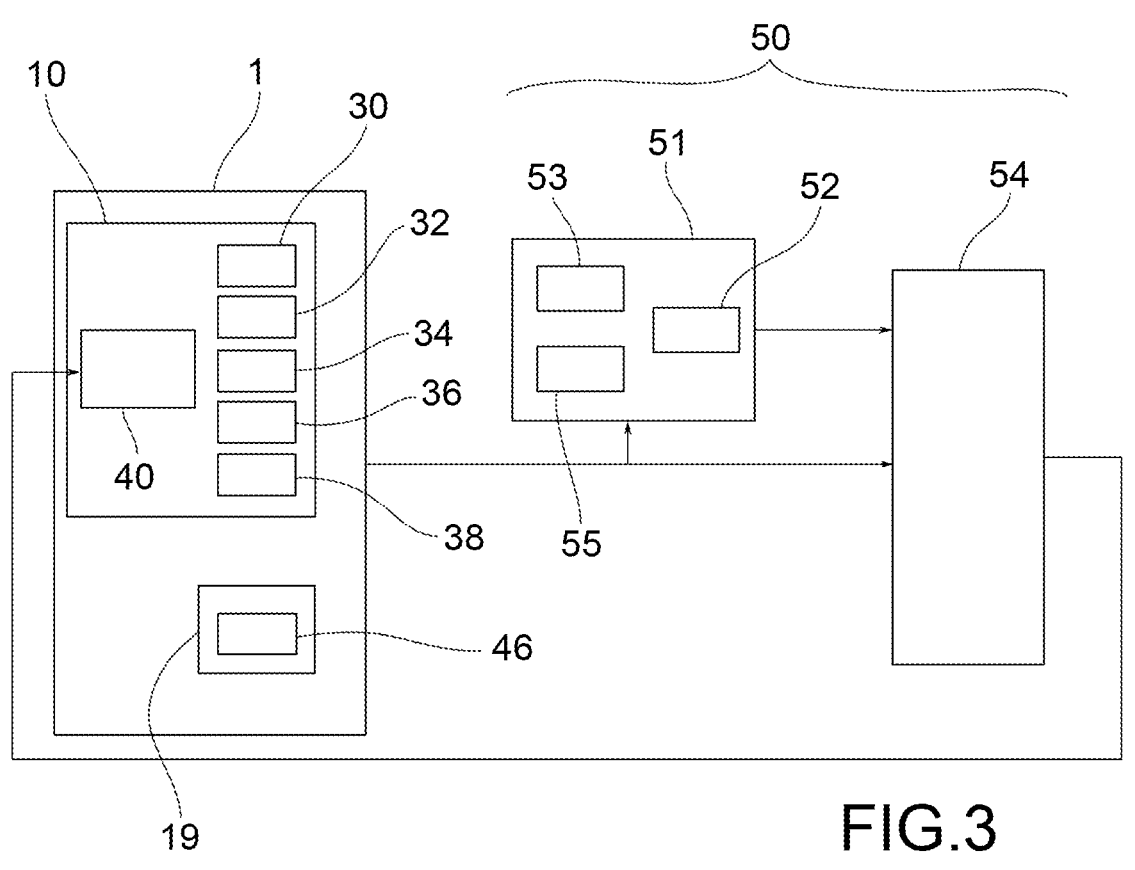
FIG. 3 is a block diagram of the set of sensors/actuators and software modules of the gripper according to the invention.

In an embodiment illustrated in the block diagram of FIG. 3, the gripper body 10 houses:

a jaw position sensor 30 that is suitable for measuring the absolute position of the jaws;

a line pressure sensor 32 that is suitable for measuring the air pressure in the gripper supply line;

an opening chamber pressure sensor 34 that is suitable for measuring the pneumatic pressure within a gripper opening chamber of the pneumatic actuation group 14;

a closing chamber pressure sensor 36 that is suitable for measuring the pneumatic pressure within a gripper closing chamber of the pneumatic actuation group;

pressure regulators 40 that are suitable for controlling the pneumatic pressure within the opening and closing chambers.

In one embodiment, the jaws 18 or fingers 19 are provided with a force and/or torque sensor 46, for example a load cell that is suitable for measuring the gripping force and two associated angular moments.

The gripper 1 comprises, or is connected to, a processing unit 50 operatively connected to the aforementioned sensors and pressure regulators. The processing unit 50 comprises an estimation module 51, including in particular a friction estimation module 52, and a friction compensation module 54, described below.

The estimation module 51 may further include a jaw speed estimation module 53 and a center of pressure (CoP) estimation module 55.

The measurements provided by the (gripper body and jaws) sensors may be used by the estimation module 51 in order to estimate the following quantities:

the speed of the jaws: the measurements provided by the jaw position sensor are used to calculate the relative speed between the jaws 18 and the gripper body 10. Since each jaw 18 is rigidly connected to the respective finger 19, the speed of the jaws also corresponds to the speed of the fingers 19;

Centre of Pressure (CoP): the measurements obtained from the force and/or torque sensor 46 may provide a precise estimation of the center of pressure (CoP) coordinates of the contact between the jaws or fingers and the item to be gripped;

Friction force: the estimation of the speed of the jaws, the estimation of the center of pressure and the measurements provided by the force and/or torque sensor are combined by an algorithm of the friction estimation module 52 in order to estimate the friction force of the jaws.

Some methods for calculating the friction forces by the estimation module may now be described.

Figure 4:
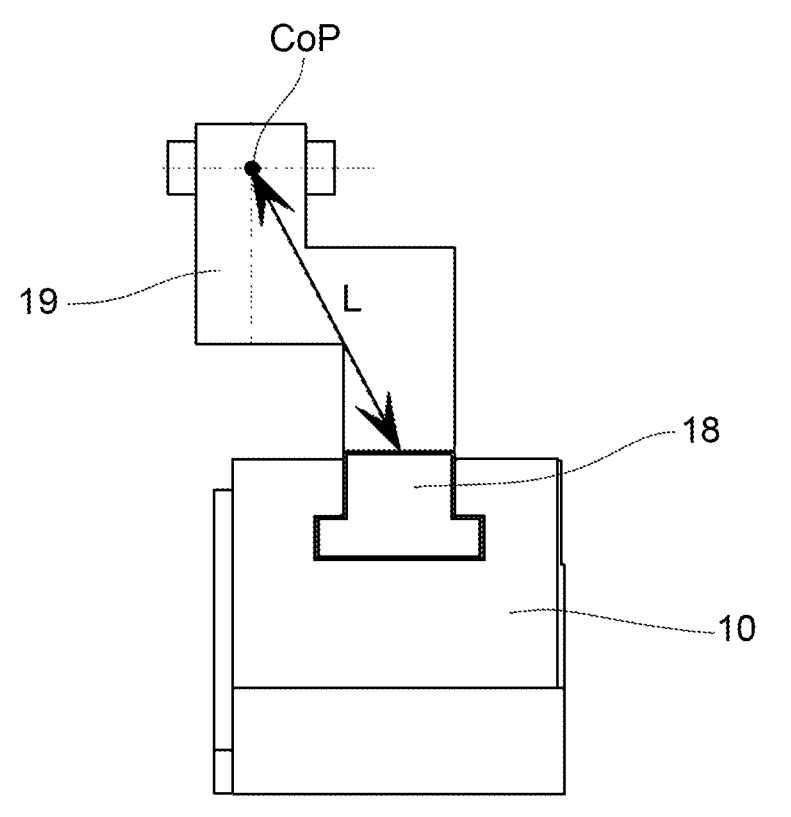
FIG. 4 is a schematic side view of a gripper, wherein the distance between the center of pressure of the jaws and the sliding guide of the jaws is represented.

A factor that influences the calculation of the friction forces in pneumatic grippers with linear sliding guides is the gripping distance L (FIG. 4), i.e. the distance between the center of pressure (CoP) and the origin of reference system of the force and/or torque sensor 46 (if present) or from the point of application of the actuation force exerted by the actuation group.

In fact, in grippers of this type, the same force applied to the jaws produces different gripping forces depending on the distance of the item gripped by the guides, as the values of the moments cause a variable friction in the guides of the jaws.

Measuring the gripping distance L allows this side effect to be compensated and to obtain greater accuracy in the application of the desired gripping force. Due to the estimation of the center of pressure (CoP) it is possible to calculate the distance L.

In the following description, $F_{fi}$ and $F_{vi}$ indicate the components of the static and dynamic friction forces, respectively, where i indicates the number of surfaces that exert a constraining reaction on the components of the transmission group and on the jaws, in the case of static friction, or of the sliding surfaces, in the case of dynamic friction.

In particular, the knowledge of the static friction forces $F_{fi}$ contributes significantly to correctly estimate the gripping force. These forces affect the operation and performance of the gripper and change as a function of the gripping distance L and consequently of the moment generated.

According to an aspect of the invention, an equations model that makes it possible to estimate these forces without any experimental identification is used to obtain the value of the components of the friction forces.

In particular, in the case of static friction, the i-th components of the forces depend on the constraining reactions $R_i$, which are functions of the actuation force acting upon the jaws (by means of the transmission group). Knowing the value of this actuation force, it is possible to estimate the value of the constraining reactions $R_i$ by making them explicit in the equations of the developed model. Finally, using the specific coefficients of friction known for the materials and/or lubricants used, it is possible to reconstruct the value of the friction forces.

In the static case, i.e. when the speed of the jaws $\dot{z}$ is zero, the i-th friction force $Ff_i$ is expressed as follows:

$$Ff_i = R_i * u_i * \beta$$

where $\mu_i$ is the coefficient of friction of the materials or lubricant used, $R_i$ is the constraining reaction that normally acts upon the surface under consideration and $\beta$ is a parameter relating to the sign of the speed of the jaws, indicating the direction of the friction force.

As mentioned above, at least some of the constraining reactions $R_i$ are a function of the coordinates of the center of pressure, i.e. the distance L between the center of pressure and the origin of the reference system of the force and/or torque sensor or the point of application of the actuation force.

Alternatively, the coefficient of friction $\mu_i$ may be expressed by means of one of the friction models used in multi-body mechanical systems, for example the Coulomb model, where the friction force may be expressed as follows:

$$F = \begin{cases} F_C \mathrm{sgn}(\dot{z}) & \text{if } \|\dot{z}\| \neq 0 \\ \min(\|F_e\| \cdot F_C)\mathrm{sgn}(F_e) & \text{if } \|\dot{z}\| = 0 \end{cases}$$

where $\dot{z}$ is the speed of the jaws (or of the jaws), $Fc=R_i*\mu c$, where $R_i$ is the i-th component of the constraining reaction acting upon the i-th surface, $\mu c$ is the coefficient of kinetic friction, and where Fe is the result of the external forces.

In the dynamic case, another contribution must be considered, i.e., the viscous friction forces ($F_{vi}$) generated by the movement. With i indicating the number of sliding surfaces, the i-th component of the static friction force ($F_{vi}$) is estimated by means of the formula $$F_{vi} = C_i * \dot{z}$$

$$\text{where } Ci = \eta_i * (S_i/d_i),$$

where $\dot{z}$ is the speed of the jaws, $\eta_i$ is the kinematic viscosity of the lubricant used, $S_i$ is the width of the i-th sliding surface and $d_i$ is the distance between the i-th sliding surface and the surface against which it slides.

Therefore, the friction estimation module is configured to estimate the static and/or dynamic friction forces acting upon the components of the transmission group 15 and upon the jaws 18, the static friction forces being calculated by the estimation module based on the constraining reactions to which components of the transmission group and the jaws are subjected. These constraining reactions are calculated as a function of the actuation force exerted upon the jaws by the actuation group, the coefficient of friction ($\mu_i$) of the gripper materials and/or lubricant used being known.

The dynamic friction forces are calculated by the estimation module on the basis of the speed of the jaws, the width of the sliding surfaces and the distance between said sliding surfaces of the jaws, the viscosity of the lubricant used being known.

The friction compensation module 54 is configured to control the actuation group 14 (e.g. the at least one pressure regulator 40 in the case of a pneumatic gripper) based on the signals from the sensors and the estimated friction forces from the estimation module 52.

As cited above, in some embodiments, the center-of-pressure sensor (CoP) is based on the gripping force sensor, which is suitable for performing torque measurements. In this case, the processing unit calculates the coordinates ($CoP_X$, $CoP_Y$) of the center of pressure as:

$$\begin{cases} CoP_X = \dfrac{M_Y}{|F_Z|} \\ CoP_Y = \dfrac{M_X}{|F_Z|} \end{cases}$$

where $M_X$ and $M_Y$ are the moments measured by the gripping force sensor along the X and Y axes respectively, and where $|F_Z|$ is the absolute value of the effective gripping force along the Z axis.

The pneumatic gripper described above makes it possible, due to the sensors and algorithms of the estimation module and the friction compensation module, to achieve the intended objectives. In particular, the jaws and therefore the fingers are controlled, taking into account the effects of the friction forces, thus compensating them.

Furthermore, with the proposed gripper the following functions may be implemented much more accurately than with pneumatic grippers according to the state of the art:

detecting the contact with the item being gripped;

estimating the coordinates of the Center of Pressure;

estimating the normal force;

measuring the orientation of the gripper and jaws;

checking the gripping force;

detecting the contact between the jaws and the item gripped;

correcting the gripping force from external disturbances (e.g. contacts, accelerations);

In addition, the gripper above allows the following technical advantages to be obtained:

evaluating the performance of the gripper based on efficiency (wear or problems);

foreseeing when the gripper requires maintenance (for example due to wear, defects, missing lubricant);

improving safety (for people and items).

To the forms of embodiment of the gripper and the method of controlling the gripping of an item according to the invention, a person skilled in the art, in order to meet contingent needs, may make modifications, adaptations, and make substitutions of elements with others that are functionally equivalent, without going beyond the scope of the following claims. Each of the features described as belonging to a possible embodiment may be obtained independently of the other described embodiments.

The invention claimed is:

1. A gripper, comprising:

a gripper body;

at least two gripping jaws, at least one of which is movable with respect to another one between a jaw opening position and a jaw closing position;

an actuation group housed inside the gripper body;

a transmission group housed inside the gripper body, the actuation group being operatively coupled to the at least one movable jaw by the transmission group to move said at least one movable jaw between the jaw opening position and the jaw closing position;

a jaw position sensor, suitable to measure an absolute position of the gripping jaws;

a gripping force sensor suitable to measure a gripping force applied by the gripping jaws to an item;

a processing unit operatively connected to said sensors and to said actuation group and comprising a friction estimation module and a friction compensation module, wherein:

the friction estimation module is configured to estimate static and dynamic friction forces acting on components of the transmission group and on the gripping jaws, the static friction force being calculated by the friction estimation module based on constraining reactions to which the components of the transmission group and the gripping jaws are subjected, the constraining reactions being calculated at least as a function of an actuation force applied by the actuation group and/or the gripping force measured by the gripping force sensor, a friction coefficient ($\mu_i$) of materials of the gripper and/or of lubricant used being known, the dynamic friction force being calculated based on speed of the gripping jaws, width of sliding surfaces of the gripping jaws, and distance between said sliding surfaces, viscosity of the lubricant used being known; and the friction compensation module is configured to control the actuation group based on signals from the sensors and on estimation of the friction forces from the friction estimation module.

2. The gripper of claim 1, further comprising an actuation force sensor suitable to measure the actuation force applied by the actuation group to the at least one movable jaw.

3. The gripper of claim 1, further comprising at least one center-of-pressure sensor, suitable to detect coordinates of a center of pressure (CoP) between the gripping jaws when the gripping jaws apply the gripping force to the item.

4. The gripper of claim 3, wherein, with i indicating a number of constraining surfaces that apply a constraining reaction, the i-th component of the static friction force ($F_{fi}$) is estimated by $$F_{fi} = R_i * \mu_i * \beta,$$

where $R_i$ is the i-th component of a constraining reaction acting on the i-th surface, and $\beta$ is a parameter indicating a direction of the static friction force.

5. The gripper of claim 4, wherein the static friction force (F) is estimated using a Coulomb model expressed by $$F = \begin{cases} F_C \text{sgn}(\dot{z}) & \text{if } \|\dot{z}\| \neq 0 \\ \min(\|F_e\|, F_C)\text{sgn}(F_e) & \text{if } \|\dot{z}\| = 0 \end{cases}$$

where $\dot{z}$ is the speed of the gripping jaws,

Fc=$R_i * \mu c$, where $R_i$ is the i-th component of a constraining reaction acting on the i-th surface, $\mu c$ is a kinetic friction coefficient, and $F_e$ is a resultant of external forces.

6. The gripper of claim 4, wherein at least some components of the constraining reaction $R_i$ are calculated as a function of the coordinates of the center of pressure (CoP).

7. The gripper of claim 3, wherein the center-of-pressure (CoP) sensor is based on the gripping force sensor, the gripping force sensor being suitable to carry out torque measurements, the processing unit being programmed to calculate the coordinates of the center of pressure ($CoP_X$, $CoP_Y$) as:

$$\begin{cases} CoP_X = \dfrac{M_Y}{|F_Z|} \\ CoP_Y = \dfrac{M_X}{|F_Z|} \end{cases}$$

where $M_X$ and $M_Y$ are measured moments of the gripping force sensor according to X and Y axes, respectively, and $|F_Z|$ is the absolute value of the actual measured gripping force along a Z axis.

8. The gripper of claim 1, wherein, with i indicating a number of sliding surfaces of the gripping jaws, the i-th component of the dynamic friction force ($F_{vi}$) is estimated by $$F_{vi} = C_i * \dot{z}$$

where $$Ci = \eta_i * (S_i / d_i),$$

where $\dot{z}$ is the speed of the gripping jaws, $\eta_i$ is the viscosity of the lubricant used, $S_i$ is a width of the i-th sliding surface, and $d_i$ is a distance between the i-th sliding surface and a surface against which the i-th sliding surface slides.

9. The gripper of claim 1, wherein the actuation group is a pneumatic actuation group and comprises a piston unit comprising at least one piston slidably housed in a respective piston chamber formed in the gripper body, said at least one piston being operatively connected to at least one jaw sliding in a jaw guide.

10. A method for controlling a gripping force of a gripper, wherein the gripper comprises:

a gripper body;

at least two gripping jaws, at least one of which is movable with respect to another one between a jaw opening position and a jaw closing position;

an actuation group housed inside the gripper body;

a transmission group housed inside the gripper body, the actuation group being operatively coupled to the at least one movable jaw by the transmission group to move said movable jaw between the jaw opening position and the jaw closing position;

the method comprising:

estimating static and dynamic friction forces acting on components of the transmission group and on the gripping jaws, adjusting an actuation force applied by the actuation group to the at least one movable jaw based on an estimate of the friction forces, wherein the static friction force is calculated based on constraining reactions to which the components of the transmission group and the gripping jaws are subjected, the constraining reactions being calculated at least as a function of the actuation force applied by the actuation group and/or a gripping force applied by the gripping jaws to an item, a friction coefficient ($\mu_i$) of materials of the gripper and/or lubricant used being known, and wherein the dynamic friction force is calculated based on speed of the jaws, width of sliding surfaces of the gripping jaws, and a distance between said sliding surfaces of the gripping jaws, viscosity of the lubricant used being known.

11. The method of claim 10, wherein, with i indicating a number of constraining surfaces that apply a constraining reaction, the i-th component of the static friction force ($F_{fi}$) is estimated by $$F_{fi} = R_i * \mu_i * \beta,$$

where $R_i$ is the i-th component of a constraining reaction acting on the i-th surface, and $\beta$ is a parameter indicating a direction of the static friction force.

12. The method of claim 11, wherein the static friction force (F) is estimated using a Coulomb model expressed by $$F = \begin{cases} F_C \text{sgn}(\dot{z}) & \text{if } \|\dot{z}\| \neq 0 \\ \min(\|F_e\|, F_C)\text{sgn}(F_e) & \text{if } \|\dot{z}\| = 0 \end{cases}$$

where $\dot{z}$ is the speed of the gripping jaws,

Fc=$R_i$*pc, where $R_i$ is the i-th component of the constraining reaction acting on the i-th surface, μc is a kinetic friction coefficient, and $F_e$ is a resultant of external forces.

13. The method of claim 12, further comprising:

calculating the coordinates of a center of pressure (CoP) between the gripping jaws when the gripping jaws apply the gripping force to the item; and calculating at least some components of the constraining reaction $R_i$ as a function of said coordinates of the center of pressure (CoP).

14. The method of claim 10, wherein, with i indicating a number of sliding surfaces of the gripping jaws, the i-th component of the dynamic friction force (F vi) is estimated by $$F_{vi} = C_i * \dot{z}$$

where $$C_i = \eta_i * (S_i/d_i),$$

where $\dot{z}$ is the speed of the jaws, $\eta_i$ is the viscosity of the lubricant used, $S_i$ is a width of the i-th sliding surface, and $d_i$ is a distance between the i-th sliding surface and a surface against which the i-th sliding surface slides.

* * * * *